(12) United States Patent
Wall et al.

(10) Patent No.: US 8,705,417 B2
(45) Date of Patent: Apr. 22, 2014

(54) IN-NETWORK HOME GATEWAY FOR HYBRID FIBER-COAX NETWORK

(75) Inventors: William E. Wall, Atlanta, GA (US);
James Eugene Cannella, Jr., Rowell, GA (US); David Burleson, Duluth, GA (US); William D. Woodward, Jr., Lilburn, GA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 12/830,585

(22) Filed: Jul. 6, 2010

(65) Prior Publication Data

US 2011/0002245 A1 Jan. 6, 2011

Related U.S. Application Data

(60) Provisional application No. 61/223,303, filed on Jul. 6, 2009.

(51) Int. Cl.
*H04L 5/00* (2006.01)

(52) U.S. Cl.
USPC ............ 370/297; 370/328; 370/401; 375/222

(58) Field of Classification Search
None
See application file for complete search history.

(56) References Cited

U.S. PATENT DOCUMENTS

| | | | |
|---|---|---|---|
| 6,882,709 B1* | 4/2005 | Sherlock et al. | 379/90.01 |
| 2003/0046706 A1* | 3/2003 | Rakib | 725/111 |
| 2008/0025327 A1* | 1/2008 | Kumar | 370/401 |
| 2008/0120667 A1* | 5/2008 | Zaltsman | 725/110 |
| 2009/0046728 A1* | 2/2009 | Matthews | 370/397 |
| 2010/0100918 A1* | 4/2010 | Egan et al. | 725/111 |

* cited by examiner

*Primary Examiner* — David Oveissi
(74) *Attorney, Agent, or Firm* — Meunier Carlin & Curfman, LLC

(57) ABSTRACT

A network gateway function that is provided at a coaxial tap of a hybrid-fiber coaxial broadband network that feeds a customer location. A Data Over Cable Service Interface Specification (DOCSIS) modem may be embedded in the tap wherein the DOCSIS protocol is terminated. A network functionality such as firewall and network address translation is provided at a network termination point that may use Multimedia over Coax (MoCA) or other similar technology using an existing coaxial cable drop to a customer location that effectively extends a home network to the tap.

19 Claims, 5 Drawing Sheets

IN-NETWORK HOME GATEWAY FOR HYBRID FIBER-COAX NETWORK

CROSS-REFERENCE TO RELATED APPLICATIONS

The present application claims priority to U.S. Provisional Patent Application No. 61/223,303, filed on Jul. 6, 2009 and entitled "IN-NETWORK HOME GATEWAY FOR HYBRID FIBER-COAX NETWORK," which is incorporated herein by reference in its entirety.

BACKGROUND

Service providers, such as cable companies are providing ever-increasing Internet Protocol (IP) based services to their subscribers. A majority of existing subscriber homes are wired with coaxial cable, and the service providers are attempting to utilize the existing coaxial cable within homes to provide these services rather than requiring customers to install a separate network infrastructure.

Within a customer location, a residential gateway may be deployed to route IP packets through the home. The residential gateway provides interfaces to the network to support access technologies in use at the home (e.g., Ethernet or Multimedia over Coax (MoCA)). In addition, the residential gateway may support multicast (IGMP) support for broadcast video applications, Quality of Service (QoS), and high-speed Internet access (e.g., wired Ethernet and 802.11x wireless connectivity) along with integrated firewall protection. IP voice applications may be supported with RJ-11 jacks employing SIP-based voice for attachment of traditional telephones.

However, to provide a residential gateway within each home increases cost per household. In addition, there are increased installation costs. Also, as data rates increase to/from the home, the ability of the Data over Cable Service Interface Specification (DOCSIS) protocol to work efficiently is impaired within a home cable environment due to cable splits and Radio Frequency (RF) noise ingress.

SUMMARY

A gateway device to bridge from DOCSIS IP transport in the network to a home network domain that is provided in a coaxial tap that feeds the homes. The coaxial tap is located outside the home in a position within the service provider network, and can feed multiple homes. The allows the service provider to share costs among plural homes. In addition, the gateway may be serviced without intruding into a customer location. The gateway provides firewall, network address translation (NAT), Digital Living Network Alliance (DLNA) functionality, as well as a conversion to an in-home network technology such as MoCA or WiFi.

In accordance with some implementations, there is provided a network gateway. The network gateway may include a data modem that receives an RF input from a network and provides a termination point for data services within the network gateway. Plural network termination points may be provided, wherein each network termination point is communicatively connected to the data modem to provide networking functionalities. Plural output ports may be provided, wherein each output is connected to a respective network termination point and to the RF input through a splitter within the network gateway. The network gateway may be provided in a network tap of a hybrid-fiber coaxial broadband network, and networking functionalities may be individually provided to connected customer locations from the network gateway.

In some implementations, there is provided a network tap of a hybrid-fiber coaxial broadband network having a network gateway. The network tap may include a splitter that splits an incoming RF signal into the network gateway into plural RF outputs. A DOCSIS modem may be provided that receives an RF output from the splitter and provides a termination point for data services. Plural Multimedia over Coax Alliance (MoCA) network termination points may also be provided, wherein each MoCA network termination point is communicatively connected to the DOCSIS modem to provide networking functionalities. The tap may include plural output ports, wherein each output is connected to a respective MoCA network termination point and to an RF output from the splitter through a diplexer.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Figure 1:
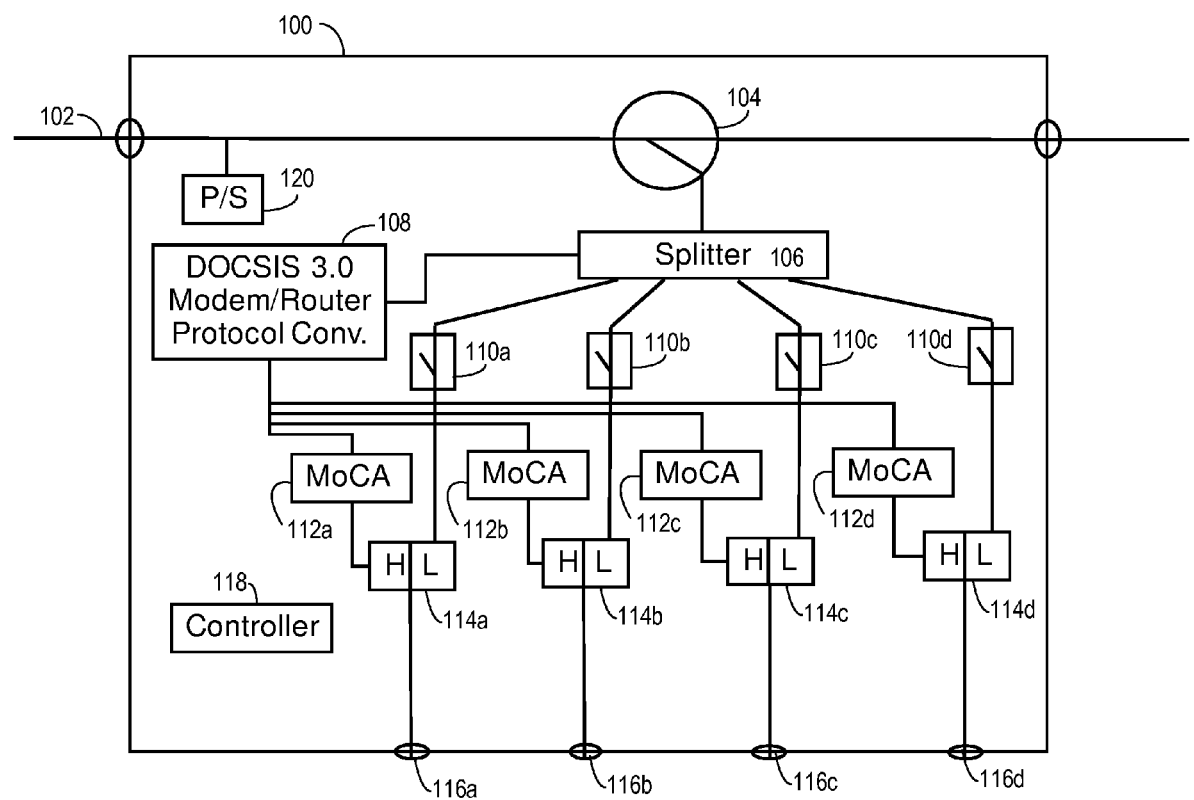
FIG. 1 is a block diagram of an example network gateway implemented within a network tap.

FIG. 1 is a block diagram of an example network gateway 100 implemented within a network tap. The network gateway 100 may be used in, e.g., a hybrid-fiber coaxial broadband network. The network gateway 100 of the present disclosure may be located outside of a customer location and serve a number of customer locations, e.g., 4-16 (or more). A fiber optic network may extend from, e.g., a cable operator's headend to a fiber optic node, which serves from 25 to 2000 homes. The node may include a broadband optical receiver which converts an optically modulated signal coming from the headend to an electrical signal (e.g., Radio Frequency (RF)). The RF signal may be communicated along a coaxial conductor 102 that enters the network gateway 100 from the node. A portion of the RF signal is passed through a tap 104 and into a splitter 106.

The splitter 106 splits the RF signal from the tap 104 and sends a portion to a modem/router/protocol converter 108 and to switches 110a-110d. The modem/router/protocol converter 108 may include a Data over Cable Service Interface Specification (DOCSIS) v 3.0 (or higher) modem that provides services such as, broadband Internet connectivity, digital voice, real-time interactive gaming, and video conferencing. Information regarding the DOCSIS specification may be obtained from the Cable Television Laboratories, Inc. of Louisville, Colo., USA.

The modem/router/protocol converter 108 may provide networking and/or application functionalities to the modem output, as described in greater detail with reference to FIG. 2. The networking functionalities may be provided to Multimedia over Coax Alliance (MoCA) terminations 112a-112d associated with a respective one of outputs 116a-116d of the network gateway 100. The output of each of the MoCA terminations 112a-112d is input to high frequency band input (e.g., >1 GHz) of a respective diplexer 114a-114d.

MoCA provides for home networking on existing coaxial cable as a physical layer, using Orthogonal frequency-division multiplexing (OFDM) modulation. The MoCA terminations 112a-112d may be transceiver implementing OFDM modulation and may also act as a reflector to minimize losses of the MoCA signal within the customer location. As such, coaxial cable may be used for data connections to televisions, set-top boxes, and other entertainment devices within the customer location (see, FIG. 5). MoCA may be provided in either a channel bonding or unique links arrangement. Information regarding MoCA may be obtained from the Multimedia over Coax Alliance, San Ramon, Calif., USA.

A portion of the RF signal is split by the splitter 106 is also input to a respective switches 110a-110d associated with the outputs 116a-116d. This portion of the RF signal is split to provide so-called "legacy" services (e.g., video-on-demand, Quadrature amplitude modulation (QAM) broadcast) to a customer location via the outputs 116a-116d. Each switch 110a-110d may be turn off/on the legacy services for each location connected to the outputs 116a-116d. In some implementations, the switches 110a-110d may turn off the return path for DOCSIS 2.0 (or lower) modems within the customer location (e.g., as part of an in-home network). Turning off the return path when a DOCSIS 2.0 (or lower) modem in a customer location is not transmitting, serves to reduce noise and transients in the RF signal, thus resulting in a cleaner RF reverse spectrum in the service provider's network. The switches 110a-110d may be remotely actuated by the service provider using an application services functionality of the network gateway 100. The RF signal output by the switches 110a-110d may be input to a low frequency band input (e.g., <1 GHz) of a respective diplexer 114a-114d. The MoCA and legacy services may be combined by the each diplexer 114a-114d and provided to each of the outputs 116a-116d. The outputs 116a-116d may each serve a respective customer location. The communication between the outputs 116a-116d and the customer location(s) may be encrypted to protect the customer's communications.

The network gateway 100 may also include a controller 118 and a power supply 120. The power supply 120 may receive power from the coaxial conductor 102 to power components within the network gateway 100. The controller 118 provides for application support and mediation among the various components within the network gateway 100.

In accordance with some implementations, the network gateway 100 serves as a DOCSIS termination point and a MoCA termination point. Terminating DOCSIS at the network gateway 100 is at a near optimal point in a service provider's network in terms of reliability and signal quality, as it avoids any in-home wiring (e.g., splitters or poor quality coaxial cable). Providing a MoCA termination point in the network gateway 100 provides a measure of security (e.g., firewall protection) for each customer's network connection. In addition, MoCA more easily traverses splitters within a customer location. The network gateway 100 may also provide each individual MoCA termination with firewall protection, an individual broadband switch per tap, protocol translation, Digital Living Network Alliance (DLNA) support, and remote provisioning, as described below.

In accordance with implementations, the network gateway 100 may feed 16 (or more) customer locations depending on home density and topology. Individual network connections may be completed to each customer to provide logical isolation of individual home networks. A cost of the common components, including housing, power supply, DOCSIS modem, and signal processing may be shared by each home connected to the tap, thus reducing overall cost. Having a home network gateway outside the home minimizes installation and service costs.

As such, the network gateway 100 may provide features such as a 64 home passive coax network, 10-300 MHz Upstream (US), 376-1000 MHz Downstream (DS), 4×12 bonded US carriers, 4×24 bonded DS Carriers, and 8 static Multicast (or broadcast). Typically, each US/DS group may support 16 homes having an average DS of 58 Mbps and US of 22.5 Mbps. In some implementations, this may be higher with more advanced physical layer. In some implementations, the network gateway may provide 4, 8, or 16 port tap support, and a 400 Mbps peak throughput per home with MoCA v2.0.

Figure 2:
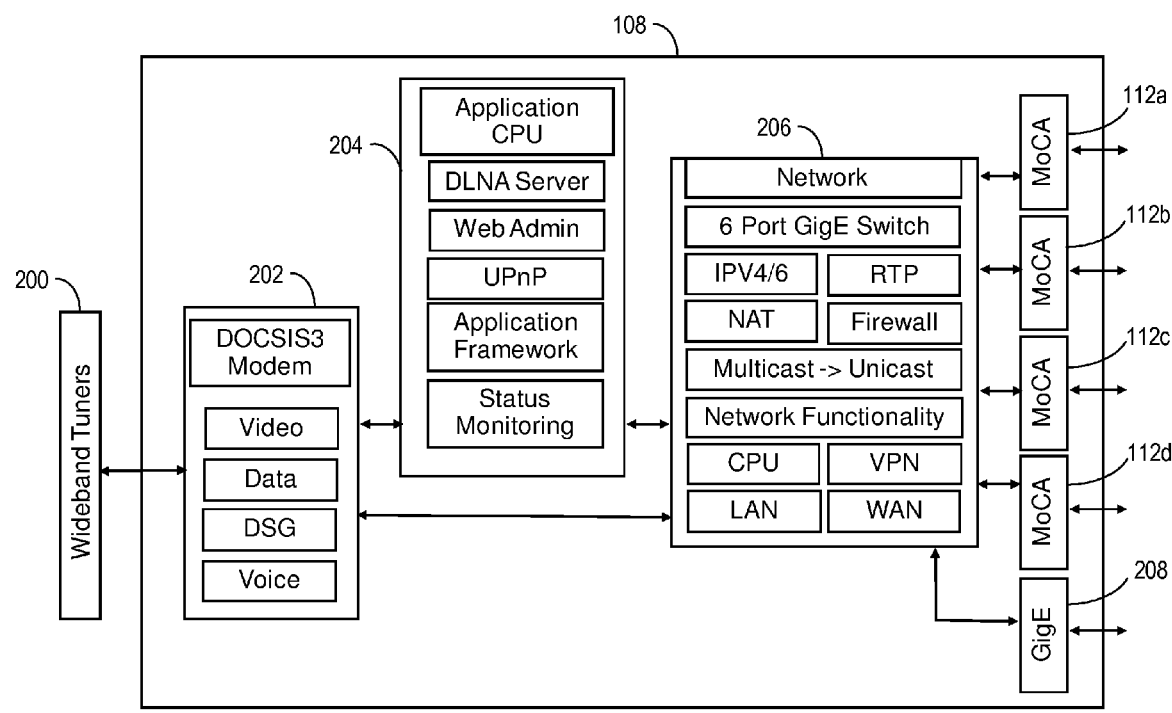
FIG. 2 is a block diagram the further details aspects of a modem/router/protocol converter of FIG. 1.

FIG. 2 is a block diagram the further details aspects of a modem/router/protocol converter 108 of FIG. 1. The modem/router/protocol converter 108 serves to terminate DOCSIS and MoCA communications in, for example, a single chip. Such a configuration provides for additional security as none of the communications is in the clear in the network gateway 100. The modem/router/protocol converter 108 may receive inputs from wideband tuners 200 that tune to a specific frequency on which the DOCSIS signals propagate over a wide bandwidth (e.g., 100 MHz). A DOCSIS modem 202 may provide for video, data, DOCSIS Set-top Gateway (DSG) and voice services. The DOCSIS modem 202 provides outputs to an application processor (CPU) 204 and a network services component 206. The application CPU 204 provides for application services, such as a Digital Living Network Alliance (DLNA) server, a Web administration server, Universal Plug and Play (UPnP) support, an application framework to create and execute applications, and status monitoring.

The network services component 206 provides network functionalities to a customer location or for ganging MoCA terminations. The network functionalities may be provided in different layers of the Open System Interconnection (OSI) Model. For example, the network services component 206 may provide a 6-port Gigabit Ethernet switch, Internet Protocol (IP) (v4/v6), Network Address Translation (NAT), a Firewall, Multicast to Unicast, a virtual private network (VPN), a local area network (LAN), a wide area network (WAN) and other network functionality. A CPU within the network services component 206 may execute instructions to manage the various networking capabilities provided by the network services component 206.

The network services component 206 may provide outputs to the MoCA terminations 112a-112d that convert the networking protocols for transport over a MoCA link to a customer location. A Gigabit Ethernet port 208 may be provided for Ethernet connections, such as those which may enable additional MoCA terminations in the network gateway 100. While communication into the customer location may be provided using MoCA, any other technology using an existing coaxial drop cable may be used. For example, G.hn (ITU recommendation G.9960 and G.9961) may be used.

In some implementations, the network gateway may be provided as DOCSIS 3 Cable Modem Termination System (CMTS) or equivalent in the node. In some implementations, the network gateway may provide voice services, such as through a Session Initiation Protocol (SIP) MoCA Client in the home.

In accordance with the implementations above, from a user perspective, networking/Firewalling, etc., associated with the customer location is provided in the network gateway 100. As such, the need for a router/NAT gateway within the customer location to provide networking to devices within the customer location is removed.

In addition to the above, the network gateway 100 provides an easy way for service providers to transition customers to more advanced services. This is because each location may be connected to a respective output 116a-116d, and thus can be transitioned by the service provider individually when moving from legacy services to MoCA services.

Figure 3:
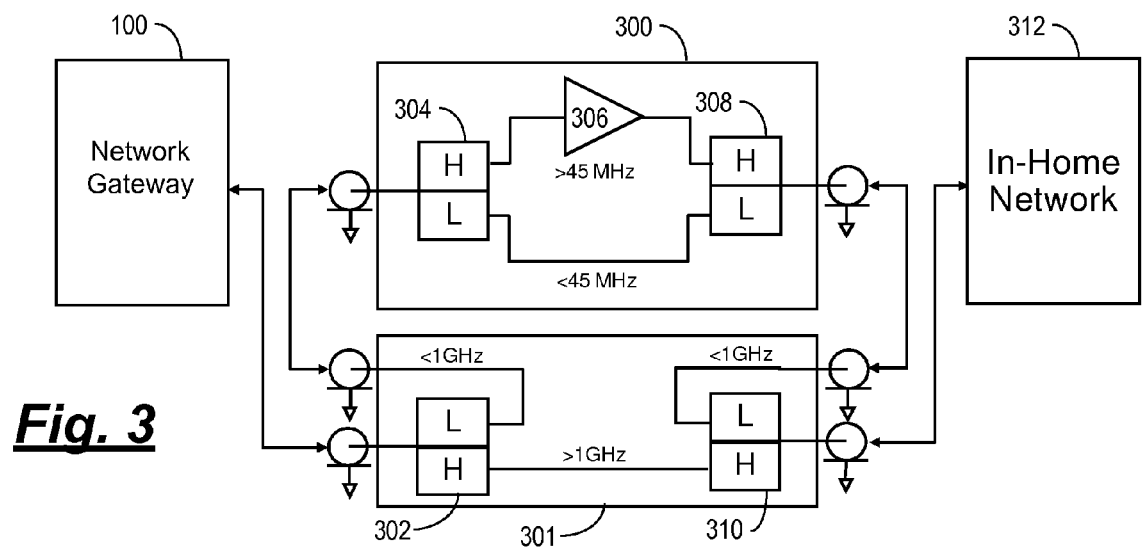
FIG. 3 is an example block diagram of a drop amplifier having a bypass path for the network gateway.

FIG. 3 is an example block diagram of a drop amplifier 300 having a bypass path for the network gateway. In conventional installations, the drop amplifier 300 may be used to boost the RF signal to a customer location from the service provider's network. The drop amplifier 300 may include a diplexer 304, amplifier 306 and a diplexer 308. The drop amplifier 300 may boost frequencies over 45 MHz to the customer location and pass return frequencies of less than 45 MHz without any amplification. However, because the networking provided by the network gateway 100 of the present disclosure is provided at high frequencies, the drop amplifier 300 does not provide for a return path to the network gateway 100. In addition, the drop amplifier 300 may alter high frequency RF signals to an in-home network 312 from the network gateway 100 in an undesirable way.

Thus, in accordance with some implementations, a passive component 301 may be added to the drop amplifier 300 to create a by-pass for MoCA communications between the network gateway 100 and the in-home network 312. The passive component 301 may include a diplexer 302 and a diplexer 310, each having a break frequency at 1 GHz. As such, the RF signal flows between the network gateway 100 and the in-home network 312 would be as follows:

| Frequency | Signal Flow |
| --- | --- |
| >1 GHz | The RF signal from the network gateway 100 to the in-home network 312 flows through the H-port of the diplexer 302 to the H-port of the diplexer 310 to the in-home network 312, and vice versa. This flow by-passes the drop amplifier 300. |
| >45 MHz and <1 GHz | The RF signal from the network gateway 100 to the in-home network 312 flows through the L-port of the diplexer 302 to the H-port of the diplexer 304. The RF signal is amplified by the amplifier 306 and passes through the H-port of the diplexer 308 to the L-port of the diplexer 310 to the in-home network 312. This path would be for, e.g., the legacy forward path. |
| <45 MHz | The RF signal from the in-home network 312 to the network gateway 100 flows through the L-port of the diplexer 310 to the L-port of the diplexer 308. The RF signal then passes through the L-port of the diplexer 304 to the L-port of the diplexer 302 to the network gateway 100. This path would be for, e.g., the legacy return path. |

Figure 4:
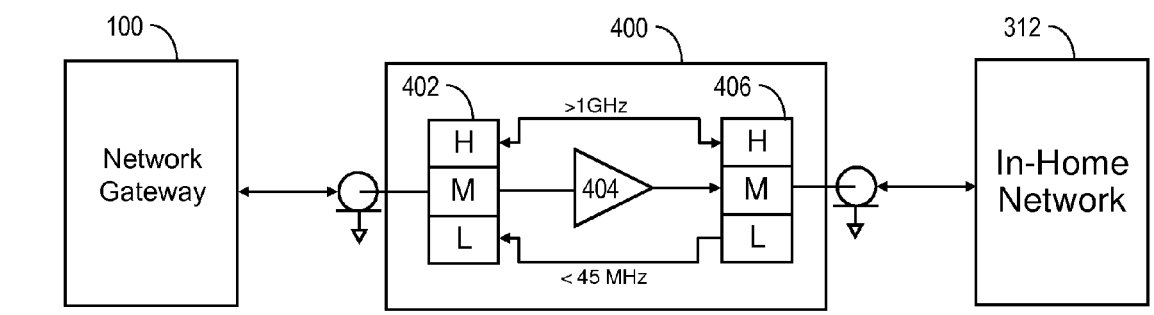
FIG. 4 is an example block diagram of a drop amplifier having an integrated return path for the network gateway.

FIG. 4 is an example block diagram of a drop amplifier 400 having an integrated return path for the network gateway. The drop amplifier 400 includes a triplexer 402, an amplifier 404, and a triplexer 406. The triplexers 402 and 406 have break frequencies at 45 MHz and 1 GHz. As such, the RF signal flows between the network gateway 100 and the in-home network 312 would be as follows:

| Frequency | Signal Flow |
| --- | --- |
| >1 GHz | The RF signal from the network gateway 100 to the in-home network 312 flows through the H-port of the triplexer 402 to the H-port of the triplexer 406 to the in-home network 312, and vice versa. |
| >45 MHz and <1 GHz | The RF signal from the network gateway 100 to the in-home network 312 flows through the M-port of the triplexer 402 the amplifier 404 and then to the M-port of the triplexer 406. This path would be for, e.g., the legacy forward path. |
| <45 MHz | The RF signal from the in-home network 312 to the network gateway 100 flows through the L-port of the triplexer 406 to the L-port of the triplexer 402. This path would be for, e.g., the legacy return path. |

Figure 5:
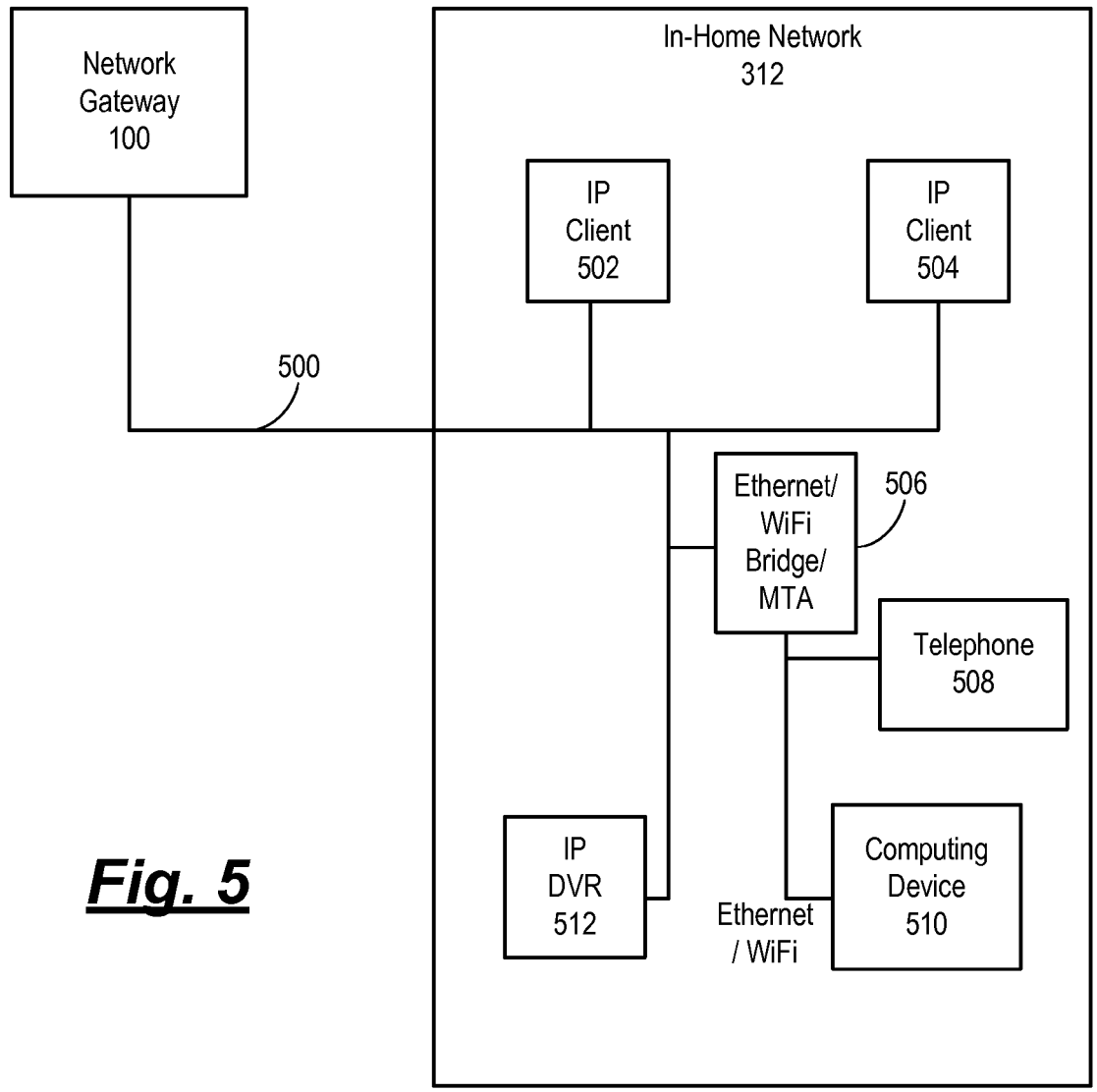
FIG. 5 is an example network overview in which the network gateway may be utilized.

FIG. 5 is an example network overview in which the network gateway 100 may be utilized. The example network overview of FIG. 5 is merely exemplary, and should not be construed as limiting the disclosure. The network gateway 100 may provide services to many different types of devices connected to the in-home network 312 at a customer location. For example, a MoCA communication link 500 may extend between the network gateway 100 (e.g., from one of outputs 116a-116d) and the customer location. The clients may include an IP client 502 and an IP client 504 that each may be a video client (e.g., a set-top box). The MoCA communication link 500 may connect to an IP digital video recorder (DVR) 512 that can record video content.

The MoCA communication link 500 may also connect to an Ethernet/802.11x (WiFi) bridge/multimedia terminal adapter (MTA) 506 that converts MoCA communication to different physical layer transports. For example, a computing device 510 may be connected by an Ethernet or WiFi connection. An IP telephone 508 may connect to the MTA to provide voice services at the customer location. Thus, many different devices having different interfaces may be connected to the MoCA link 500.

Figure 6:
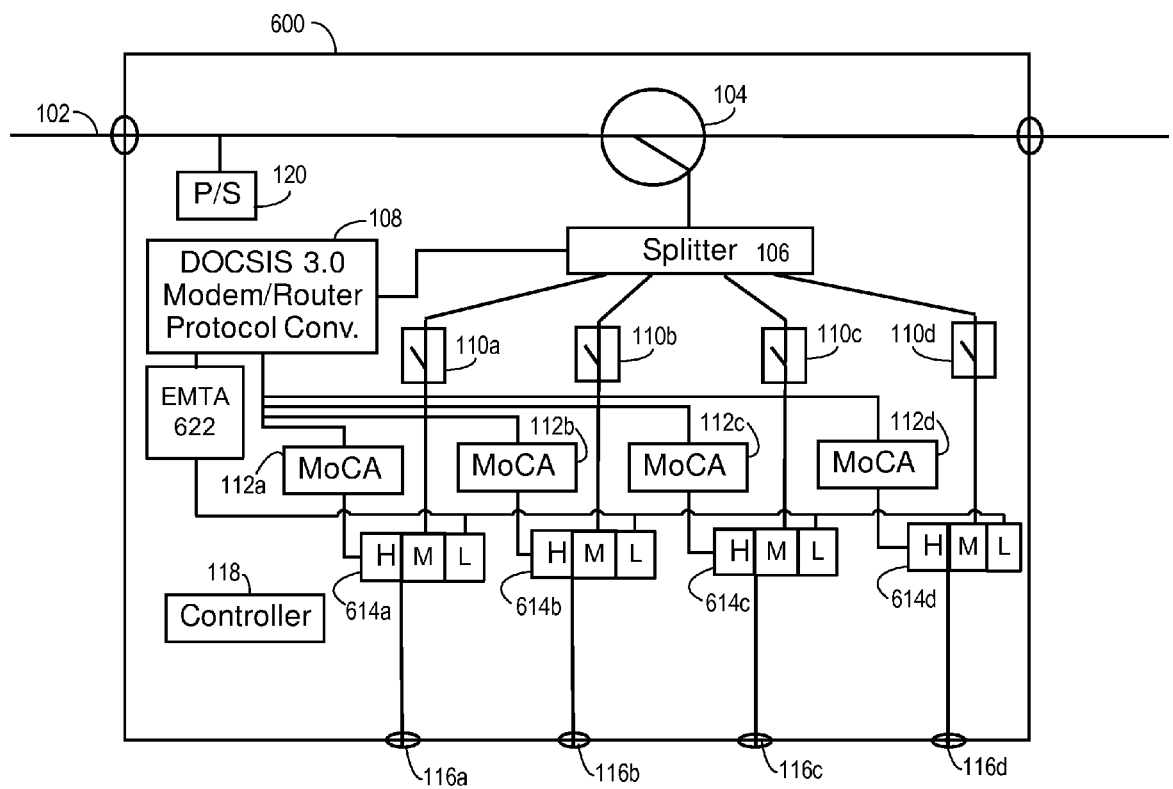
FIG. 6 is a block diagram of an example network gateway implemented within a network tap and having an Embedded Multimedia Terminal Adapter (EMTA).

FIG. 6 is a block diagram of an example network gateway 600 implemented within a network tap and having an Embedded Multimedia Terminal Adapter (EMTA) 622. Where the network gateway 600 is similar to the network gateway 100 of FIG. 1, like reference numerals are used. The description of such similar components are provided above with reference to FIG. 1. In the network gateway 600, the DOCSIS modem within the modem/router/protocol converter 108 may include the EMTA 622 to provide plain old telephone service (POTS) to a customer location. The EMTA 622 may be physically within the modem/router/protocol converter 108 or provided as externally connected functionality.

POTS service is typically very low frequency (e.g., <3 kHz). Thus, the output of the EMTA 622 associated with each customer location may be input to the low frequency input of a respective triplexer 614a-614d. It is noted that separate EMTA outputs from the EMTA 622 may be provided for each output 116a-116d, however for clarity of FIG. 6, only one is shown. In the network gateway 600, the output of each of the MoCA terminations 112a-112d is input to high frequency band input (e.g., >1 GHz) of the respective triplexer 614a-614d. The RF signal output by the switches 110a-110d may be input to a middle frequency band input (e.g., <1 GHz and >3 kHz) of a respective triplexer 614a-614d. Thus, the POTS, MoCA and legacy services may be combined by the each triplexer 614a-614d and provided to each of the outputs 116a-116d. As in the network gateway 100, the outputs 116a-116d may each serve a respective customer location.

The POTS service may be provided to the customer location by running twisted pair from the network gateway 600 to the customer location, or by providing the POTS signals on the coaxial drop cable to the customer's location and converting to twisted pair at the customer location using a bridge device. The network gateway 600 may provide a network powered EMTA, rather than an in-home battery-backed EMTA to customers, to further enhance the reliability of voice services provided by the service provider.

Thus, as described above, there is provided a network gateway at a tap that feeds multiple customer locations. Such implementations reduce gateway cost per home by sharing common components, and include the DOCSIS modem that may be used across multiple homes that is also in a "favored" position within the network to provide a high signal-to-noise environment and allow the fastest possible connection within the network. The implementations provide individual MoCA connections into the home to provide high home network performance and privacy to each home network. The implementations further provide a mechanism for remote enabling or disabling of home services without a service call ("truck roll"), and lowers operating expense by not requiring in-home installation or service.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A network gateway, comprising:
    a data modem that receives an RF input from a network and provides a termination point for data services within the network gateway;
    plural network termination points, wherein each network termination point is communicatively connected to the data modem to provide networking functionalities; and
    plural output ports, wherein each output is connected to a respective network termination point and to the RF input through a splitter within the network gateway,
    wherein the network gateway is provided external to customer locations and includes a network tap of a hybrid-fiber coaxial broadband network, and wherein to networking functionalities are individually provided from the network gateway to connected customer locations, wherein an output of each network termination point is input to a high frequency band input of a respective diplexer, wherein an RF output of the splitter is input to a low frequency band input of the respective diplexer, and wherein the output of the respective diplexer is provided to the output.

2. The network gateway of claim 1, wherein the data modem is a Data over Cable Service Interface Specification (DOCSIS) modem version 3.0 or higher, and wherein the DOCSIS modem provides data services to each connected customer location.

3. The network gateway of claim 1, wherein the networking functionalities are Multimedia over Coax Alliance (MoCA) networking functionalities.

4. The network gateway of claim 1, wherein legacy services are provided to the output.

5. The network gateway of claim 1, further comprising a switch associated with each RF output from the splitter to enable or disable services.

6. The network gateway of claim 5, wherein both downstream and upstream services are enabled or disabled by the switch.

7. The network gateway of claim 1, further comprising a power supply that receives power from a coaxial conductor that carries the RF input.

8. The network gateway of claim 1, wherein each network termination point is provided with firewall protection, and wherein each network termination point can be remotely provisioned.

9. The network gateway of claim 1, further comprising an embedded multimedia adapter, wherein the network gateway provides plain old telephone service to the connected customer locations.

10. The network gateway of claim 1, further comprising an application processor that provides for at least one of a Digital Living Network Alliance (DLNA) server, a Web administration server, Universal Plug and Play (UPnP) support, an application framework to create and execute applications, and status monitoring.

11. The network gateway of claim 1, further comprising an Ethernet port, wherein additional network termination points are added to the network gateway at the Ethernet port.

12. The network gateway of claim 1, further comprising a bypass path associated with a drop amplifier to which the network gateway is connected, wherein the bypass path is provided to enable bi-directional networking functionalities.

13. A network tap of a hybrid-fiber coaxial broadband network provided within a network gateway, comprising:
- a splitter that splits an incoming RF signal into the network gateway into plural RF outputs;
- a DOCSIS modem that receives an RF output from the splitter and provides a termination point for data services;
- plural Multimedia over Coax Alliance (MoCA) network termination points, wherein each MoCA network termination point is communicatively connected to the DOCSIS modem to provide networking functionalities; and
- plural output ports, wherein each output is connected to a respective MoCA network termination point and to an RF output from the splitter through a diplexer,
- wherein the DOCSIS modem is version 3.0 or higher, and wherein the network gateway is located external to a customer location.

14. The network tap of claim 13, further comprising a switch associated with each output port to turn off services provided on the incoming RF signal.

15. The network tap of claim 14, wherein both downstream and upstream services are turned off by the switch.

16. The network tap of claim 13, further comprising an embedded multimedia adapter, wherein the network gateway provides plain old telephone service.

17. The network gateway of claim 13, further comprising a Gigabit Ethernet port, wherein additional MoCA termination points are added to the Gigabit Ethernet port.

18. The network tap of claim 13, further comprising a bypass path associated with a drop amplifier to which the network gateway is connected, wherein the bypass path is provided to enable bi-directional networking functionalities.

19. An apparatus for providing networking functionality to a customer location from a network tap in a hybrid-fiber coaxial broadband network, comprising:
- a DOCSIS modem that receives an RF input from the hybrid-fiber coaxial broadband network and provides a termination point for data services;
- plural Multimedia over Coax Alliance (MoCA) network termination points, wherein each MoCA network termination point is communicatively connected to the DOCSIS modem to provide the network functionality to the customer location; and
- plural output ports, wherein each output is connected to a respective MoCA network termination point,
- wherein the apparatus includes the network tap and are located external to the customer location.

* * * * *